Oct. 7, 1947.    S. D. EILENBERGER    2,428,700
CAPACITATIVE FEEDBACK DEVICE FOR ELECTRICAL TESTING
Filed Sept. 17, 1943    2 Sheets-Sheet 1

Stanley D. Eilenberger
INVENTOR

BY Munn, Liddy
& Glaccum
ATTORNEYS

Patented Oct. 7, 1947

2,428,700

UNITED STATES PATENT OFFICE 2,428,700

CAPACITATIVE FEED-BACK DEVICE FOR ELECTRICAL TESTING

Stanley D. Eilenberger, Kenosha, Wis., assignor to Wolgen Company, Chicago, Ill., a corporation of Illinois Application September 17, 1943, Serial No. 502,843

5 Claims. (Cl. 175—183)

This invention relates to a method of measuring certain properties of materials by electronic means, for example, the measurement of the moisture content of paper. By way of further example, the instrument may also be used for determining the degree of ripeness in fruit, the thickness of one material applied over a second material, where both materials are non-conductors, such as, for example, one or more coats of paint on wood or Bakelite.

Numerous methods have been proposed for measuring the property of material where the actual quantitive measurement was in terms of absolute capacity. In such arrangements the change in capacity is utilized to further control the frequency of an oscillator or the degree of feedback in an oscillator, these changes being interpreted in suitable terms to determine the property of the material under test.

The present invention makes use of feedback, but the measurements made do not depend on absolute capacity change. This invention discloses further improvements in such measurement circuits, in particular disclosing an arrangement whereby measurements are made independent of the total mass of the material under test, such measurements also being made without actually contacting the material under test or without having an electrode on the opposite side of the material under test, all measurements being made with the electrode assembly disposed adjacent to only one side of the material under test.

The objects of this invention are:

First, to provide a method of determining the properties of any non-conductor, where any change in such properties may be interpreted in terms of surface resistivity, volume resistivity, specific inductance capacity and/or thickness.

Second, to provide a method as in the first object above, where all measurements are made with an electrode assembly disposed adjacent to the material under test on one side only, without resorting to an electrode placed on the opposite side of said material.

Third, to provide a method as in the first and second objects above, where such measurements are made without making physical contact with the material under test, the electrode structure being disposed in the near vicinity of but not in physical contact with said material.

Fourth, to provide a method of detecting the presence of an object in the near vicinity of the measurement electrodes, where said object may be either a conductor or a non-conductor.

Fifth, to measure the displacement or distance of a conducting or non-conducting object from the electrode assembly.

Sixth, to provide a method for continuously monitoring the moisture content of the atmosphere by placing moisture absorbing material in the vicinity of the electrode.

Seventh, to provide a method of combining any or all of the objects set forth above.

It is well known in the art that any amplifier will oscillate if the output of said amplifier is coupled to the input of said amplifier, providing sufficient energy is fed back from the output side of said amplifier to the input side of said amplifier. This must always be so, irrespective of whether such feedback is obtained capacitively, inductively, resistively or by other means. It is also well known in the art that the frequency of oscillation in this case will be determined by the circuit constants and that said frequency may be made any value desired by properly adjusting said circuit constants.

As previously stated, numerous measurement methods have been based on this feedback principle, where actual measurements were made in terms of absolute change of some value such as capacity, inductance or resistance. Briefly, the present invention discloses a method of measuring the properties of material without the limitation implied in measuring absolute values. This is accomplished by the use of two electrodes, one connected to the output of an amplifier and one connected to the input of an amplifier, said electrodes being so shielded from each other that with no test piece in the field therebetween oscillation does not normally occur, or substantially only a slight degree of stabilized oscillation occurs, and with all circuit values so adjusted that for arbitrary normal condition of the material under test a steady state reading is obtained on the indicating instrument, said reading being any value desired and for certain applications the most desirable value would be zero. For this condition a small change in the material undergoing test will produce a large deflection of the measuring instrument. For example, in measuring the moisture content of paper it is entirely practical to have a deflection ratio of the measuring instrument of 100:1, with an increase in moisture content provided by merely blowing the breath on a moving roll of paper, the actual moisture content in this case being a small fraction of 1%. Similar sensitivity may be realized irrespective of the types of material undergoing test. In each case the instrument is adjusted for a particular application and the indicating meter calibrated in suitable terms.

This invention will be best understood in consideration of the following detailed description, in view of the accompanying drawings forming a part of the application. Nevertheless, it is understood that the invention is not confined to the disclosure, being susceptible to such changes and modifications as define no material departure from the salient features of the invention as expressed in the appended claims.

Figure 1:
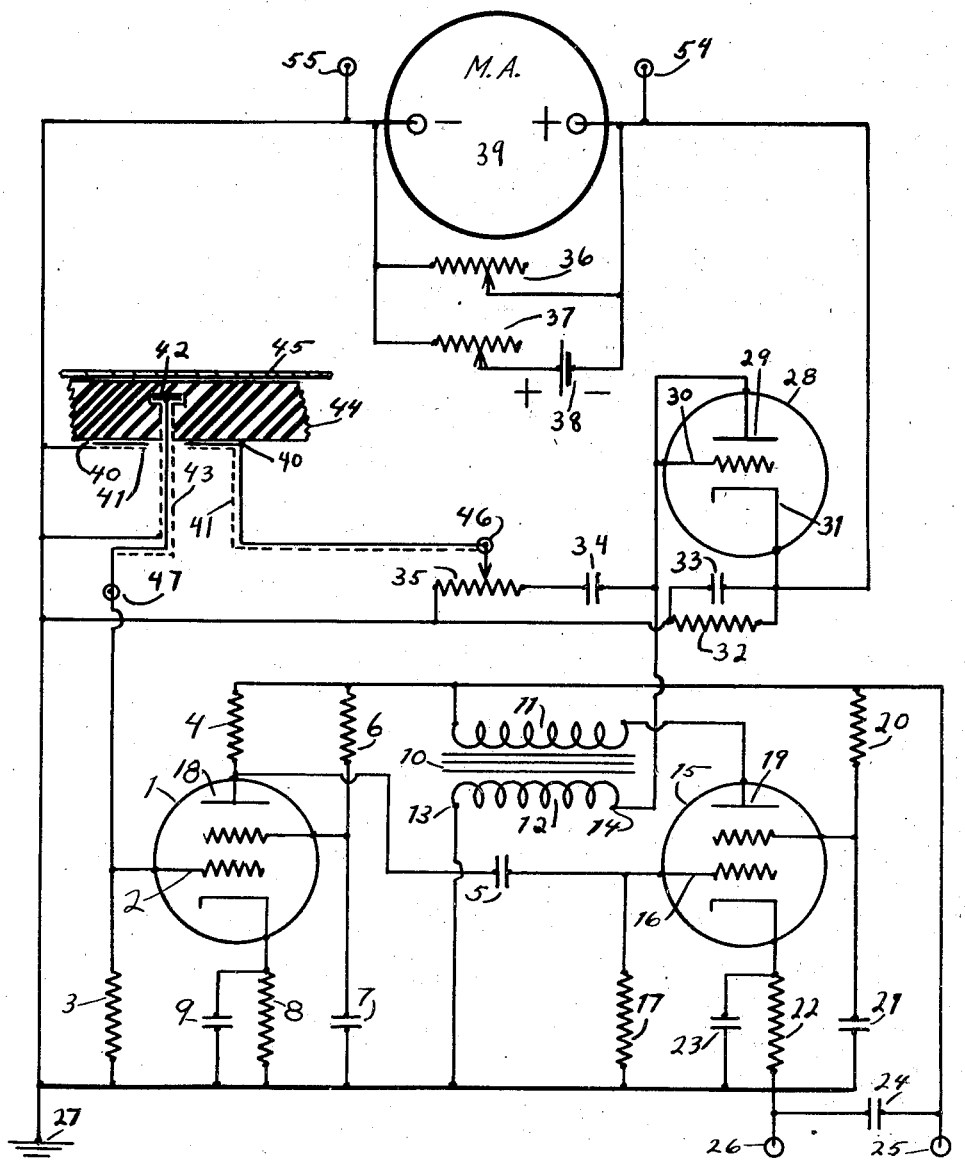
Figure 1 represents a complete schematic circuit arrangement, including a cross section view of the test electrode assembly.

Referring more particularly to Figure 1, a typical amplifier is represented by vacuum tubes 1 and 15, where vacuum tube 1 is the input stage, here represented as a pentode, and vacuum tube 15 is the output stage, also here represented as a pentode, it being understood that any number of such stages may be used and that vacuum tubes other than pentodes may be used in such amplifiers. The particular arrangement used is dependent upon the actual application and is further dependent upon the electrode design and also on the frequency of oscillation desired or necessary for any particular application.

The amplifier arrangement represented by Figure 1 has been operated in actual practice and found to be entirely satisfactory, with circuit constants so adjusted as to provide oscillation at an audio frequency on the order of 4000 C. P. S., it being understood that these circuit constants may be so altered or adjusted as desired or necessary for any particular application, it being further understood that oscillation at a high radio frequency provides better results for certain applications, while a medium or low audio frequency may be found more satisfactory for other applications. Control grid 2 of vacuum tube 1 is connected to terminal 47, which in turn is connected to metallic electrode 42, said connecting lead being shielded by grounded shield 43, said grounded shield also shielding part of electrode 42, so that only the top area remains unshielded. Grid resistor 3 may be of any nominal value such as .5 megohm. Plate 18 of vacuum tube 1 is coupled to control grid 16 of vacuum tube 15 by coupling condenser 5, the value of which is in part determined by the desired frequency of oscillation, .005 mfd. being approximately correct for medium audio frequency.

Plate 19 of vacuum tube 15 is transformer coupled to the output circuit by iron core transformer 10 which has a primary winding 11 and secondary winding 12, said secondary winding 12 being connected through diode rectifier 28 to indicating meter 39 and terminal 14 of secondary winding 12 is also connected to feedback electrode 40 in series with coupling condenser 34 and feedback control 35, it being understood that terminals 13 and 14 are reversable to obtain the proper phase relationship to provide oscillation. Screen resistors 6 and 20, screen by-pass condensers 7 and 21, cathode resistors 8 and 22, cathode by-pass condensers 9 and 23, plate resistor 4 and grid resistor 17 are all chosen in accordance with the values necessary for the particular tubes in use and the amount of voltage gain necessary to produce the desired sensitivity. The B negative power supply terminal is represented by 26 and the B plus power supply terminal by 25, where 24 is a power supply by-pass condenser, it being understood that the plate voltage supplied at the terminals 26 and 25 is preferably regulated to close tolerance to provide good stability. The common ground terminal is represented by 27.

For the arrangement shown a voltage gain on the order of magnitude of 1000 is necessary, in order to provide accurate measurement, it being understood that other voltage gains may also be used, depending upon the particular application for which the measuring instrument is to be used. For example, for certain applications involving small changes or greater measurement distance, voltage gains on the order of 50,000 to 100,000 are necessary. In general, voltage gains less than 1000 do not provide good results.

Vacuum tube 28 is operated as a diode rectifier, with grid 30 and plate 29 connected together; this arrangement provides a sensitive rectifier, it being understood that any type of rectifier may be used. Resistor 32 is the rectified voltage load resistor and condenser 33 is the rectified voltage by-pass condenser, the values being so chosen as to give good stability. Cathode 31 of vacuum tube 28 is connected to the positive terminal of the indicating meter, the negative terminal of said meter being connected to common ground 27, both terminals of said meter being connected to connecting points 54 and 55 which may, if desired, be further connected to a control mechanism, for example, where the change in voltage across meter 39 was utilized to operate a control device, such as, for example, a gas discharge tube which in turn may operate a control relay. Both terminals of indicating meter 39 are also connected to meter shunt 36 which is adjusted to give the desired sensitivity, and also may be used to provide any desired calibration characteristic, the value of shunt rheostat 36 being dependent upon the internal resistance of meter 39. Both terminals of indicating meter 39 are also connected to battery 38 and rheostat 37, which are in series, this arrangement providing a bucking circuit designed to hold indicating meter 39 at zero reading, or any other value desired, with normal current flowing through meter 39 in the opposite direction, it being understood that other forms of this arrangement may also be used, or that such calibration and zero bucking circuit may be omitted if desired.

Input electrode 42 and output electrode 40 are mounted in a non-conductor 44, which may be any material desired, preferably one having a low dielectric constant, such as, for example, polystyrene. In general, the dielectric constant of the mounting material 44 should be lower than the dielectric constant of the material 45 it is desired to measure. For example, if grade C Bakelite having a nominal dielectric constant of 7.0 was used for mounting material 44, very poor results would be obtained if test material 45 had a dielectric constant on the order of 4.0. This is so because the feedback provided by material 44 is greater than the feedback provided by the test material. I have found that best results are obtained if mounting material 44 has a dielectric constant in the range of 2.0 to 3.0. Shields 43 and 41 restrict the electric field lines between electrodes 40 and 42, so that with proper adjustment of feedback control 35, substantially zero oscillation is obtained, although more sensitive results may be had by so adjusting feedback control 35 that very slight stabilized oscillation takes place, with no test material, as indicated by 45, in the electric field of electrode assembly 40—42. This condition of zero or minimum oscillation will provide a small current through indicating meter 39. For any given condition meter 39 may be returned to zero reading by adjustment of rheostat 37 and this adjustment, to a large degree, is independent of the adjustment of rheostat 36, which effects only the sensitivity of indicating meter 39. Indicating meter 39, in the arrangement shown, may have a nominal full scale value of 1 milliammeter.

With the circuit adjusted as outlined immediately above, any test material, as indicated by 45, placed within the electric field lines between electrodes 40—42 will provide an increased reading on meter 39, provided that test material 45 has a relatively low capacity to ground, which is the actual case with practically all non-conductors, such as paper, wood, paint, cloth, etc. Where test material 45 is a conducting or semi-conducting material, it is possible to so adjust circuit values as to obtain a decrease in current through meter 39. This is so because a conducting or semi-conducting material 45, having relatively high capacity to ground, provides increased shielding between electrodes 40 and 42, thus reducing the feedback voltage.

Nominally, the instrument is intended for use in testing non-conducting materials. By way of practical example, the test material 45 may well represent a roll of paper moving by electrode 42 at relatively high speed, said test material 45 not being in actual contact with either electrode 42 or electrode 40, but being so arranged as to be in continuous intimate contact with electrode mounting material 44.

The entire circuit may then be adjusted for any desired amount of moisture content in test material 45, which is assumed to be paper moving at high speed, for the purposes of this example. For example, a moisture content of from 3% to 5% is normal at certain stages in the process of paper manufacture. Assuming this to be the case, circuit constants may be so adjusted that for a moisture content of 4% a zero center (mid scale) reading is obtained on indicating meter 39. Indicating meter 39 may then be calibrated in terms of moisture content above or below 4%. This arrangement may be made sufficiently sensitive that changes in moisture content on the order of .01% or less will produce a readable scale deflection, it being understood that such changes in current made may also be utilized to operate additional control circuits, with such control circuits designed to correct the moisture content of the paper to the desired value.

The arrangement described immediately above may be made relatively independent of small changes in thickness of the test material, and also of small changes in distance between test material 45 and electrode holder 44, the actual reading obtained being dependent totally on the change in moisture content of the test material, which is reflected as a change in conductivity of the test material and is further reflected as a change in specific inductive capacity of the test material, both of said changes cooperating to alter the feedback between shielded electrodes 40 and 42. It is understood that the method outlined for moisture content of paper is given only by way of example, and that a similar method may be applied to a large variety of materials. For example, the moisture content of fruit varies with the degree of ripeness. Also, the surface resistivity, the volume resistivity and the specific inductive capacity of most fruits change with the degree of ripeness. For determining the degree of ripeness in fruits, vegetables or similar materials, the same arrangement previously disclosed for measuring the moisture content of paper may be used, in which case 45 represents the fruit or vegetable being tested and 44 may well represent the test table. Such an arrangement may be adapted for continuously indicating the degree of ripeness of each individual item, as it passes through the electric field existing between electrodes 40 and 42. If this field is made relatively small as compared to the item undergoing test, the measurement secured is largely independent of mass and dependent almost entirely on the resistivity and/or the specific inductive capacity of the test item. For example, if the design of electrodes 40 and 42 and shielding 41 and 43 is such that the electric field is restricted to an area approximating one circular inch, oranges having a nominal diameter of 2.5 to 4.0 inches may be tested for ripeness without regard to variation in size.

By way of further example, test material 45 may be a moisture absorbing material permanently attached to electrode holder 44, in which case indicating meter 39 may be calibrated in terms of the moisture content of material 45. This arrangement is suited to continuously indicating the moisture content of the atmosphere, as the amount of moisture present in material 45 will vary with atmospheric moisture content.

Figure 2:
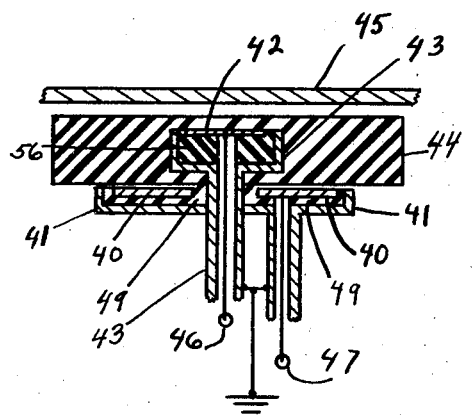
Figure 2 represents a cross section view of the electrode assembly in greater detail than shown by Figure 1, with a sample test material in the field of said electrode.

Referring now to Figure 2, an enlarged electrode assembly is illustrated in cross section, all reference numerals being identical to the reference numerals used in connection with Figure 1, except that Figure 2 clearly illustrates insulating section 49 interposed between electrode 40 and grounded shield 41, and further illustrates insulating section 56 interposed between electrode 42 and grounded shield 43, said insulating sections being omitted from the electrode assembly of Figure 1 for the sake of clarity in the drawings.

Figure 3:
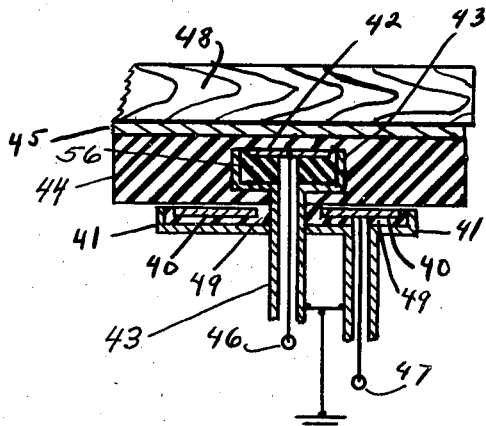
Figure 3 represents a similar cross section view of the test electrode, with a test material in the field of said electrode, with said test material attached to or in the field of a second material not actually under test.

Referring now to Figure 3, the electrode assembly illustrated in cross section is identical to Figure 2, with the exception that test material 45 is interposed between electrode holder 44 and a second material represented by 48. For this condition, 45 may well represent one or more coats of paint while 48 may well represent the non-conducting material to which said paint is applied. For this application, the entire electrode assembly may take the form of a portable probe, and assuming reasonably constant resistivity and specific inductive capacity values for material 48, the reading obtained on indicating meter 39 of Figure 1 will then be a function of the thickness of material 45.

Figure 4:
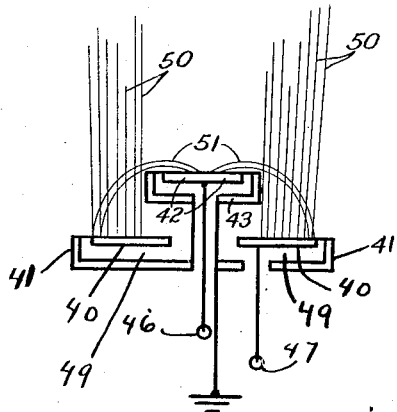
Figure 4 represents the electric field lines between the electrodes for the condition where no test material is in the electric field.

Referring now to Figure 4, an outline view of the electrode assembly is shown, including the electric field between electrodes 40 and 42, for a condition where no test material is in the electric field area, all electrode reference numerals being the same as previously used. Schematically, the main electric field lines are represented by 50, it being understood that such electric field does not necessarily conform to the shape of field lines 50, which are shown diagrammatically and only for reasons of convenience. Due to grounded shielding 41 and 43, the main electric field lines 50 will convey little energy between electrode 40 and electrode 42, and only a small amount of this energy, as represented by electric field lines 51, will reach electrode 42. In actual practice, shielding 41 and 43 may be made so complete that substantially no energy from electric field 50 reaches electrode 42, with no test material in the electric field 50, which in general may be considered as an electrostatic field.

Figure 5:
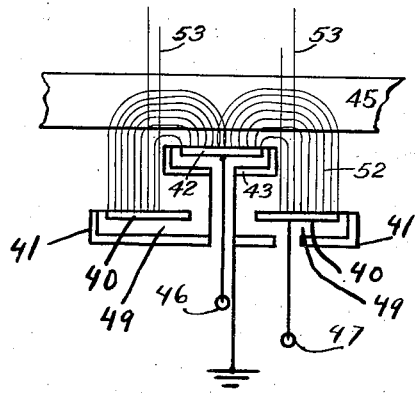
Figure 5 represents the electric field lines between electrodes when a test material is inserted in the vicinity of said electric field.

Figure 5 is similar to Figure 4, except that test material 45 has been inserted in the electric field so that the main electric field, as represented by lines 52, is now distorted so that a large amount of the energy represented by said electric field reaches electrode 42, and only a small amount of the energy, as represented by the electric field lines 53, by-passes electrode 42, the actual amount of energy reaching electrode 42 being solely determined by the properties of test material 45.

In all of the foregoing examples, it has been assumed that test material 45 was a non-conductor, or a partial conductor. For example, paper, wood, Bakelite and similar materials are nominally non-conductors, while fruits and vegetables may be classed as partial conductors. For a condition where test material 45 is a conductor, for example a metal, the method disclosed by this invention is no longer suitable in determining properties of the metal, as the electric field is distorted by approximately the same amount, irrespective of the properties of the particular metal placed in the electric field. A further consideration with conductors is that, for large sections, they may have considerable capacity to ground, which would tend to reduce the reading of indicating meter 39 in Figure 1, which is opposite to the effect achieved in testing non-conducting materials.

However, the invention may be used as a displacement or distance gage with metallic objects. If these metallic objects are small, so that they have little capacity to ground, the method is similar to the method previously described for non-conducting materials, except that the reading obtained on indicating meter 39 is now a function of the distance between electrode holder 44 and test material 45, the reading increasing as the distance becomes smaller. For the special case where test material 45 is a conductor and has a relatively high capacity to ground, the reading obtained on meter 39 will also be a function of distance, but for this case the instrument is adjusted, for example, to read full scale value for no test material in the field, the reading decreasing when the conducting material is placed in the field, the value of said reading being a function of distance between the test material and electrode holder 44. Likewise, the instrument may be adjusted for mid-scale value for any given distance between electrode holder 44 and test material 45; the reading obtained would then be a function of increase or decrease in distance between conducting test material 45 and electrode holder 44.

From the foregoing description it may be seen that my invention may be used for measuring the property of material under versatile conditions, and that the invention is adapted to measurement of a wide variety of materials, and that such measurements may be made rapidly and conveniently without resorting to actual contact with the test material, or without the necessity of having the electrodes on opposite sides of the test material, and that for certain conditions which I have described, these measurements may be made independent of the total mass of the test material.

Wherever the words uni-lateral electric field are employed in the specification and claims it is understood to mean a bi-polar electric field having both poles at one side of a plane, as opposed to a bi-polar electric field having two poles in opposite planes. For example, referring in particular to Fig. 5, electric field 50 may be considered as having polar sources 40 and 42, both polar sources being on the same side of a plane where test material 45 may be considered as the reference plane.

For purposes of this specification and claims, it is also understood that the phrase "condition of a body" is intended to include all measurable changes in a physical body, such as, for example, changes in specific inductive capacity, conductivity, dimensions, moisture content, and any and all other physical and/or chemical changes.

I claim:

1. In combination, an electrical testing apparatus including an electronic amplifier having an input circuit and an output circuit, an external feedback circuit operatively coupling the input circuit and the output circuit and including a pair of spaced feedback electrodes providing an electric field therebetween, shielding conductor means disposed between opposed portions of said electrodes but leaving unshielded portions of said electrodes facing in substantially the same direction normally to limit the transfer of feedback energy therebetween to values which will provide a minimum degree of stable oscillation in the amplifier, electrical indicating means, means operatively connecting the indicating means to the amplifier output circuit to respond to current flow therein, and dielectric means in proximity to said electrodes defining within the electric field therebetween a support for a test piece.

2. In combination, an electrical testing apparatus including an electronic amplifier having an input circuit and an output circuit, an external feedback circuit operatively coupling the input circuit and the output circuit and including a pair of spaced feedback electrodes providing an electric field therebetween, shielding conductor means disposed between opposed portions of said electrodes but leaving unshielded portions of said electrodes facing in substantially the same direction normally to limit the transfer of feedback energy therebetween, electrical indicating means, means operatively connecting the indicating means to the amplifier output circuit and in shunt relation to said feedback circuit to respond to variations in current flow therein, and dielectric means in proximity to said electrodes defining within the electric field therebetween a support for a test piece.

3. In combination, an electrical testing apparatus including an electronic amplifier having an input circuit and an output circuit, an external feedback circuit operatively coupling the input circuit and the output circuit and including a pair of spaced feedback electrodes providing an electric field therebetween and adjustable impedance means in series with said electrodes to control the amount of feedback current flow therein, shielding conductor means disposed between opposed portions of said electrodes but leaving unshielded portions of said electrodes facing in substantially the same direction normally to limit the transfer of feedback energy therebetween, electrical indicating means, means operatively connecting the indicating means to the amplifier output circuit to respond to current flow therein, and dielectric means in proximity to said electrodes defining within the electric field therebetween a support for a test piece.

4. In combination, an electrical testing apparatus including an electronic amplifier having an input circuit and an output circuit, an external feedback circuit operatively coupling the input circuit and the output circuit and including a pair of spaced feedback electrodes providing an electric field therebetween, shielding conductor means disposed between opposed portions of said electrodes but leaving unshielded portions of said electrodes facing in substantially the same direction normally to limit the transfer of feedback energy therebetween, electrical indicating means, means operatively connecting the indicating means to the amplifier output circuit to respond to current flow therein, and dielectric means mounting said electrodes in spaced relation at different elevations and defining above both of said electrodes and within the electric field therebetween a support for a test piece.

5. In combination, an electrical testing apparatus including an electronic amplifier having an input circuit and an output circuit, an external feedback circuit operatively coupling the input circuit and the output circuit and including a pair of spaced feedback electrodes providing an electric field therebetween, shielding conductor means disposed between opposed portions of said electrodes but leaving unshielded portions of said electrodes facing in substantially the same direction normally to limit the transfer of feedback energy therebetween, electrical indicating means, means operatively connecting the indicating means to the amplifier output circuit to respond to current flow therein, and dielectric means having a low dielectric constant mounting said electrodes in spaced relation at different elevations, and with one of said electrodes circumscribing the other electrode and defining above both of said electrodes a support for a test piece.

STANLEY D. EILENBERGER.

REFERENCES CITED

The following references are of record in the file of this patent:

UNITED STATES PATENTS

| Number | Name | Date |
|---|---|---|
| 1,976,904 | Terman | Oct. 16, 1934 |
| 2,231,035 | Stevens et al. | Feb. 11, 1941 |
| 2,267,884 | Zuschlag | Dec. 30, 1941 |
| 2,285,152 | Firestone | June 2, 1942 |
| 2,024,489 | Van Der Pol et al. | Dec. 17, 1935 |
| 1,987,244 | Moore | Jan. 8, 1935 |

FOREIGN PATENTS

| Number | Country | Date |
|---|---|---|
| 460,298 | Great Britain | Jan. 25, 1937 |
| 682,205 | France | May 24, 1930 |